United States Patent [19]
Harada et al.

[11] 3,861,962
[45] Jan. 21, 1975

[54] DRY CELL

[75] Inventors: Masahiro Harada; Yuuji Hirokawa; Syohei Nozaki; Kenji Miyahara, all of Fujisawa; Matsuyuki Takeda, Isehara, all of Japan

[73] Assignee: Matsushita Electric Industrial Co., Ltd., Osaka, Japan

[22] Filed: June 14, 1971

[21] Appl. No.: 152,806

[30] Foreign Application Priority Data
June 19, 1970 Japan.................... 45-61490[U]

[52] U.S. Cl. .............................................. 136/133
[51] Int. Cl. .......................................... H01m 1/02
[58] Field of Search.................... 136/107, 133, 169

[56] References Cited
UNITED STATES PATENTS

| | | | |
|---|---|---|---|
| 2,650,945 | 9/1953 | Herbert.......................... | 136/169 X |
| 2,794,060 | 5/1957 | MacFarland................... | 136/169 X |
| 2,802,042 | 8/1957 | Anthony et al................ | 136/169 X |
| 2,816,153 | 12/1957 | Kort............................... | 136/169 X |
| 2,951,891 | 9/1960 | Kempf et al................... | 136/169 |
| 2,960,558 | 11/1960 | Marsal et al................... | 136/169 X |
| 3,485,675 | 12/1969 | Ruben............................ | 136/107 X |
| 3,489,616 | 1/1970 | Fangradt et al................ | 136/107 |
| 3,510,358 | 5/1970 | Nabiullin et al............... | 136/107 |
| 3,573,990 | 4/1971 | Tsuchida et al............... | 136/133 X |
| 3,623,915 | 11/1971 | Pun et al........................ | 136/169 X |

FOREIGN PATENTS OR APPLICATIONS
664,019  9/1965  Belgium............................. 136/107

Primary Examiner—Winston A. Douglas
Assistant Examiner—O. F. Crutchfield
Attorney, Agent, or Firm—Stevens, Davis, Miller & Mosher

[57] ABSTRACT

A dry cell in which a zinc can is covered with an outer jacket with its side edges butted against each other, and the upper end of the outer jacket is bent and folded over one of the upper and lower protrusions provided on the rim of a first insulating ring mounted at a sealing portion on the cathode side, while the lower end of the outer jacket is bent and folded over a protrusion provided on the upper and lower side of the rim of a second insulating ring mounted at a sealing portion of the anode side.

3 Claims, 7 Drawing Figures

PATENTED JAN 21 1975

M. HARADA
Y. HIROKAWA,
S. NOZAKI,
K. MIYAHARA,
AND
M. TAKEDA
INVENTORS

BY Stevens, Davis, Miller & Mosher
ATTORNEYS

DRY CELL

The present invention relates to an improved exterior construction of the dry cell.

The outer jacket of a dry cell usually consists of a metal plate which is formed into a cylinder with the side ends of the plate overlapped and enfolded inwardly. Because of this overlap, the outer jacket is not concentric with the zinc can and its inner volume made smaller. For this reason, a "jointless" outer jacket 4 as shown in FIGS. 4 and 5 has been suggested in which a metal plate 1 is formed into a cylinder and the side ends 2 and 3 only butted against each other without an overlap.

In a conventional dry cell employing the jointless outer jacket as shown in FIG. 6, the upper end 5 of the outer jacket 4 is bent so that it cooperates with the upper end of a resin tube 6 to clamp the upper rim of a sealing plate 10 through a flange 8 of a cathode cap 7 and an insulating ring 9, while the lower end 11 of the outer jacket 4 is bent also inwardly to clamp the bottom rim of the zinc can 15 through the rim of the bottom plate 12 and insulating rings 13 and 14. The dry cell with this construction, however, has the disadvantages that, due to the liability of the outer jacket cylinder to restore to the former state of a flat plate, gas generated with the discharge of the dry cell and/or pressure of the electrolyte, the butted portions 2 and 3 of the outer jacket 4 expand outward, whereby the outer diameter of the outer jacket 4 becomes large compared with the standard size to such a degree that it cannot be removed from a machine or equipment in which it is used, or the outward expansion of the outer jacket weakens the clamped portions on the upper and lower ends of the dry cell, with the result that the electrolyte is easily allowed to leak outside.

Moreover, in the dry cell with the above-described construction, it is desirable to make the flange 8 of the cathode cap 7 as large as possible, since, by so doing, the clamping force is uniformly applied on the sealing plate 10 at the time of bending the upper end of the outer jacket 4, thereby contributing to the prevention of leakage of the electrolyte. However, it has hitherto been difficult to extend the flange outward for lack of any insulator between the flange 8 and the outer jacket 4.

In an attempt to prevent the outward expansion of the outer jacket 4, a suggestion has been made in which, as shown in FIG. 7, an insulating ring 17 with a protrusion 16 around the rim thereof is mounted on the bent portions at the upper and lower sides of the outer jacket 4. Since the bent portions of the outer jacket 4 engage with the ring 17 by embracing the protrusion 16, they will not expand outward. However, there still remains unsolved the problem that there is no insulating means between the flange 8 of the cap 7 and the outer jacket 4. In addition, because of the difference in shape between the upper and lower sides of the ring 17, it has to be arranged properly in the vertical direction, resulting in the lower workability of mechanical assemblers.

The present invention is aimed at obviating the above-described disadvantages of the prior art dry cells and provides a dry cell which is proof against the leakage of the electrolyte and completely insulates the cathode cap and the outer jacket.

The dry cell according to the present invention comprises an outer jacket with its side ends butted against each other, a first insulating ring with protrusions on the upper and lower sides of rims thereof and mounted at the sealing portion on the cathode side, and a second insulating ring with a protrusion at least on the lower side of the rim thereof and mounted at the sealing portion on the anode side, wherein the upper end of the outer jacket outside of a zinc can is folded on the protrusion formed on the upper side of the rim of the first insulating ring, while the lower end of the outer jacket is folded on the protrusion formed on the lower side of the rim of the second insulating ring, so that the bent portions on the upper and lower ends of the outer jacket embrace the protrusions of the first and second insulating rings respectively.

The above and other objects, features and advantages will be made apparent by the detailed description taken in conjunction with the accompanying drawings, in which.

Figure 1:
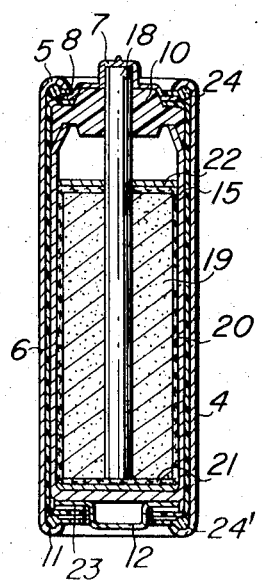
FIG. 1 is a diagram showing a longitudinal section of an embodiment of the present invention.
Figure 2:
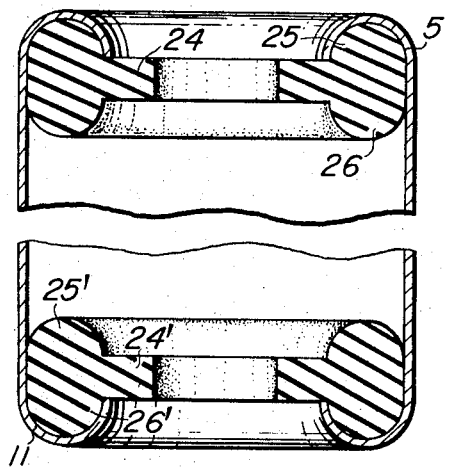
FIG. 2 is a diagram showing an enlarged sectional view of the clamped portions at the upper and lower ends of the outer jacket of the dry cell according to the embodiment of FIG. 1.
Figure 3:
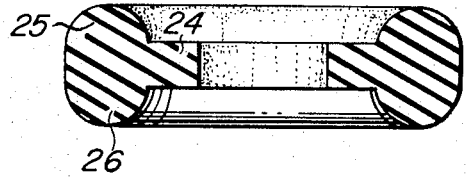
FIG. 3 is a longitudinal sectional view of an insulating ring.
Figure 4:
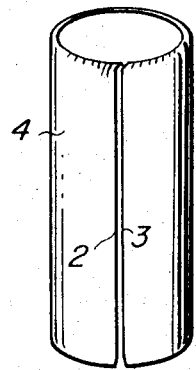
FIG. 4 is a perspective view of the outer jacket.
Figure 5:
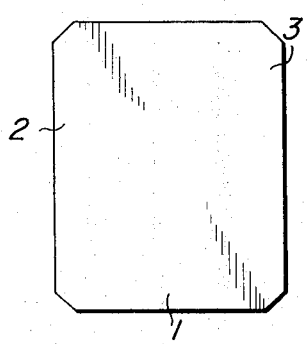
FIG. 5 shows a development of the outer jacket.
Figure 6:
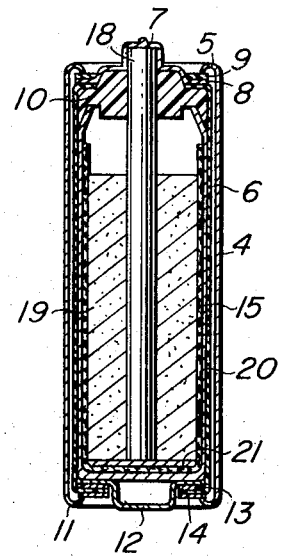
FIG. 6 shows a longitudinal section of a conventional dry cell.

Referring to FIG. 1, an anode zinc can 15 contains within it a carbon rod 18 constituting a cathode collector, a cathode composite 19 with a depolarizer of manganese dioxide, a separator 20 of kraft paper with one of its sides coated with a layer of paste consisting of methylcellulose powder attached to it, a bottom insulator 21 and an upper insulator 22. The upper opening of the zinc can is sealed with a sealing plate 10 of polyethylene. The top of the resin tube 6 which comprises a copolymer of vinyl chloride and vinyl acetate covering the outer surface of the zinc can and has the property of thermal contraction is attached closely onto the upper surface of the rim of the sealing plate 10, while the bottom of the resin tube 6 is in close contact with the rim of the bottom plate 12 through the seal ring 23. The reference numerals 24 and 24' show insulating rings of plastics with protrusions 25, 26 and 25', 26' along the upper and lower sides of the rim thereof respectively. The top or first and bottom or second insulating rings 24 and 24' are mounted respectively at the sealing portions of the cathode and anode sides. The upper bent portion 5 of the outer jacket outside of the zinc can is bent inward to embrace the protrusion 25 of the insulating ring 24, while the lower bent portion 11 is also bent inward to embrace the protrusion 26' of the insulating ring 24'. The flange 8 of the cathode cap 7 covering the top of the carbon rod 18 is sandwiched between the flat portion of the insulating ring 24 and the tube 6, the edge of the flange 8 being in contact with the protrusion 26 provided on the under side of the rim of the insulating ring 24.

Figure 7:
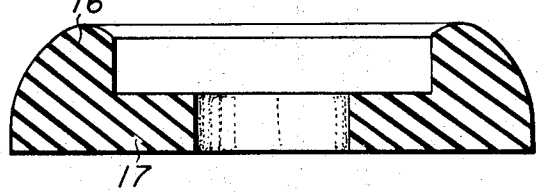
FIG. 7 shows a longitudinal section of an insulating ring used with the conventional dry cell.

As can be seen from above, the dry cell according to the present invention is provided with an insulating ring with a protrusion on the upper and lower sides of rim at the sealing portion on the anode side. Also, it is provided with the bent portions at the upper and lower ends of the outer jacket for embracing the protrusions 25 and 26' on the rims of the insulating ring. As a result, the outer jacket 4 will not expand outward since the bent portions at the upper and lower ends of the outer jacket 4 engaged with the protrusions 25 and 26' of the insulating rings 24 and 24', so that the clamping force of the outer jacket is not reduced and the outer jacket is proof against leakage of the electrolyte. In addition, the protrusion 26 on the insulating ring 24 insulates the flange 8 of the cap 7 from the outer jacket 4, thereby eliminating the problem of the short-circuiting between the cap and the outer jacket which has often occurred in the conventional insulating ring 17 shown in FIG. 7. Further, since the insulating rings 24 and 24' have no definite front and back sides and are used interchangeably, the mechanical work of assembling the dry cells is remarkably increased in efficiency.

Although, in the above-described embodiment, the insulating ring 24' provided at the sealing portion on the anode side, that is, on the bottom of the cell has, like the insulating ring 24, protrusions on the upper and lower sides of its rim, the protrusion 25' of the ring 24' may be omitted at the sacrifice of the simplicity of assembly work to some degree. In this case, the upper and lower ends of the outer jacket are clamped sufficiently to prevent the outward expansion of the outer jacket.

In the table shown below, the "AA" size cell type dry cell A according to the present invention has been compared with a conventional dry cell B as to the number of dry cells, among 100 specimens, which developed leakage after 90-day continuous discharge for 10Ω at 30°C, and the insulation resistance between the cathode cap and the outer jacket at the temperature of 20°C and the humidity of 90 percent.

| Dry cell | The number of cells which have leaked (of 100 specimens) | The number of cells with insulation resistance of below 20 M Ω/500 V (of 1000 specimens) |
|---|---|---|
| A | 2 | 2 |
| B | 25 | 68 |

It will be understood from the above description that, in the dry cell according to the present invention, the outer jacket with its side ends butted against each other does not expand outward, nor does the leakage of electrolyte or the short-circuiting between the end of the cathode cap and the outer jacket occur. In addition, the dry cell according to the present invention has the practical advantage that it is assembled more easily, thus making its mass-production possible.

What is claimed is:

1. A dry cell comprising a zinc can containing power-generating elements having an anode and cathode at opposite ends thereof with one end opening being closed with a sealing plate, a cathode cap mounted on a conductive element projecting upward through said sealing plate, said cathode cap having an element integral therewith which is disposed on said sealing plate, an anode element in contact with the other end of said zinc can, a first insulating ring located above said element of said cathode cap and having a rim with each of the upper and lower sides thereof provided with a protrusion, a second insulating ring located along the rim of said anode terminal plate and having a protrusion on the lower side of its rim, and an outer jacket covering the outer surface of said zinc can and with its both side ends butted against each other, said lower protrusion of the first insulating ring being positioned between a peripheral portion of said element of said cathode cap and an inner surface of said outer jacket, said outer jacket having its upper end bent inward and folded over said protrusion provided on the upper side of said rim of said first insulating ring, said outer jacket having its lower end bent inward and folded over said protrusion provided on the lower side of said rim of said second insulating ring.

2. A dry cell according to claim 1, comprising a second insulating ring having a rim with each of the upper and lower sides thereof provided with a protrusion.

3. A dry cell comprising a zinc can containing power-generating elements and with its upper end opening closed with a sealing plate, a cathode cap mounted on a carbon rod projecting upward through said sealing plate, said cathode cap having a flange integral therewith which is disposed on said sealing plate, an anode terminal plate in contact with the bottom surface of said zinc can, a first insulating ring located above said flange of said cathode cap and having a rim with each of the upper and lower sides thereof provided with a protrusion, a second insulating ring located along the rim of said anode terminal plate and having a protrusion on the lower side of its rim, and an outer jacket of a metal plate cylindrically bent with its side ends butted against each other, said lower protrusion of the first insulating ring being positioned between a peripheral portion of said flange and an inner surface of said outer jacket, said outer jacket having its upper end bent inward and folded over said protrusion provided on the upper side of said rim of said first insulating ring, said outer jacket having its lower end bent inward and folded over said protrusion provided on the lower side of said rim of said second insulating ring.

* * * * *